United States Patent [19]

Paillard

[11] Patent Number: 5,364,537
[45] Date of Patent: Nov. 15, 1994

[54] PROCESS FOR THE OXIDATION OF ORGANIC MICROPOLLUTANTS IN WATER USING THE $O_3/H_2O_2$ COMBINATION

[75] Inventor: Hervé Paillard, Chatou, France

[73] Assignee: OTV (Omnium de Traitements et de Valorisation), Courbevoie, France

[21] Appl. No.: 821,527

[22] Filed: Jan. 16, 1992

[30] Foreign Application Priority Data

Jan. 16, 1991 [FR] France .................. 91 00412

[51] Int. Cl.$^5$ .............. C02F 1/58; C02F 1/78
[52] U.S. Cl. .................. 210/743; 210/759; 210/760; 210/908
[58] Field of Search ......... 210/759, 760, 908, 909, 210/743

[56] References Cited

U.S. PATENT DOCUMENTS

| | | | |
|---|---|---|---|
| 3,505,213 | 4/1970 | Anthony et al. | 210/760 |
| 4,332,687 | 6/1982 | Daignault et al. | 210/721 |
| 4,572,821 | 2/1986 | Brodard et al. | 210/760 |
| 4,792,407 | 12/1988 | Zeff et al. | 210/759 |
| 4,990,316 | 2/1991 | Duguet | 210/760 |

FOREIGN PATENT DOCUMENTS 2640957 6/1990 France .

OTHER PUBLICATIONS

"The Role of Ozone in Water An Wastewater Treatment", Proceedings of the Second Inter'l Conference, Edmonton Alberta, Canada; Apr. 28–29, 1987, edited by D. W. Smith & G. R. Finch: Ozone–Hydrogen Peroxide Systems for Control of Organics in Municipal Water Supplies, by W. H. Glaze, J. W. Kang & M. Aieta.

The Chemical Society of Japan, Notes 55, 3339–3340 (1982); "Hydrogen Peroxide-Catalyzed Ozonation of Refractory Organics. I. Hydfroxyl Radical Formation", Keisuke Namba and Shigeki Nakayama, Product Development Lab Mitsubishi Electri Corp., Amagasaki, Hyogo 661.

Ozone: Science and Engineering, vol. 1, pp. 119–131, 1979, Pergamon Press Ltd., Printed in the USA; "Improved Ozonation in Aqueous Systems", authors S. Nakayama, K. Esaki, K. Namvba, Y. Taniguchi and N. Tabata. Product Devlop. Lab., Mistubishi Elec. Corp. Amagasaki, Japan.

"Comparing Peroxone and Ozone for Controlling Taste and Ordor Compounds, Disinfection By-products, and Microorganisms," by David W. Fergusion, Michael J. McGuire, Bart Koch, Roy L. Wolfe and E. Marco Aieta. Apr., 1990, pp. 181–191.

Bellamy et al., "In Line ozone dissolution demonstration scale evaluation" *Ozone Science Engineering* pp. 559–560, Dec. 1990.

Aieta et al., "Advanced oxidation processes for treating groundwater contaminated with PCE and PCE: pilot scale evaluation", *Research and Technology*, pp. 64–72, May 1988.

Dore "Chime des oxydants et traitements des eaux", *Technique et Documentation Lavoisier*, pp. 287–289 & pp. 442–444, 1989.

Paillard et al., "Conditions optimales d'application du systeme oxydant ozone–peroxyde d'hydrogene", *Water Research vol. 22:1*, pp. 91–103, 1988.

Primary Examiner—Thomas Wyse
Attorney, Agent, or Firm—Browdy and Neimark

[57] ABSTRACT

A process and device for combined oxidation of polluted water, e.g. industrial waste water or effluents, to make it suitable for drinking, involves injection of hydrogen peroxide (pure aqueous solution or diluted) and ozone (gaseous, or ozonized oxygen or air) simultaneously and in a flow direction co-current with the circulation of the water to be treated, at the inlet of the oxidation reactor. For example, a reactor is endowed with mechanisms to inject ozone and hydrogen peroxide at its base, at very closely-spaced points and simultaneously, in a flow direction the same as the water to be treated, with an automatic control system to regulate the levels of the oxidizing agents.

7 Claims, 1 Drawing Sheet

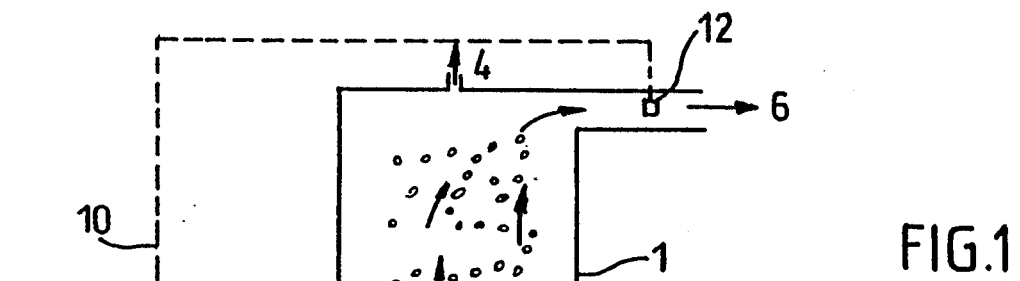
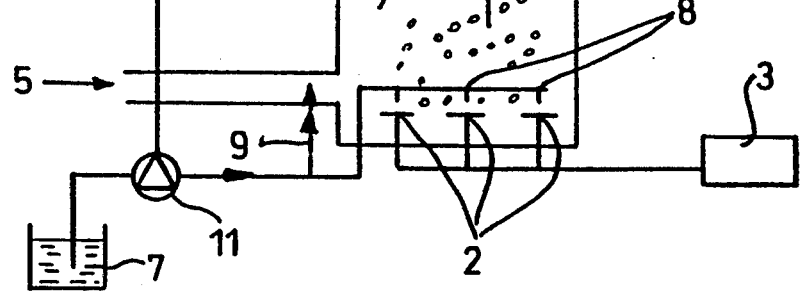
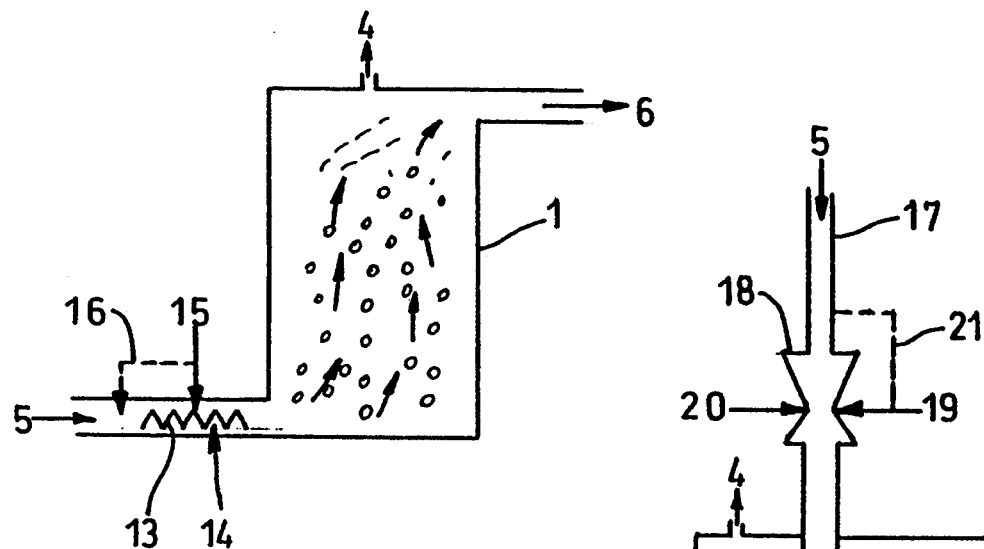
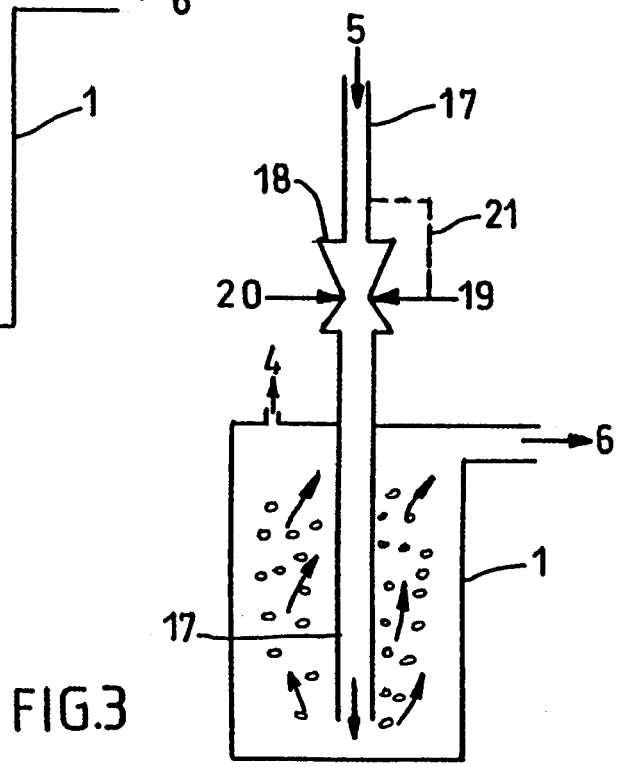
FIG.1
FIG.2
FIG.3

5,364,537

PROCESS FOR THE OXIDATION OF ORGANIC MICROPOLLUTANTS IN WATER USING THE $O_3/H_2O_2$ COMBINATION

FIELD OF INVENTION

This invention pertains to water purification, and especially to the field of treating pollutant organic materials with accelerated oxidation using the combination of ozone ($O_3$) and hydrogen peroxide ($H_2O_2$). It applies to water to be made suitable for drinking, as well as to effluents and industrial waste water to be purified.

BACKGROUND

Ozone has been long used to disinfect water and to oxidize residual organic matter and reduce mineral elements in water to be purified. The action of peroxides is also known, especially $H_2O_2$, for eliminating odoriferous compounds, oxidizing the residual phenols in the water, or eliminating toxic products such as cyanide, chrome, etc.

Because some organic or mineral compounds are difficult to oxidize with either $O_3$ or $H_2O_2$ alone, for the past decade many authors have proposed combining the action of $O_3$ with $H_2O_2$ to achieve a substantial increase in the oxidation power of each of the two oxidizing agents considered individually. Indeed, it was found and proven that highly reactive hydroxyl radicals (OH) formed when the two oxidizing agents combine caused chain reactions causing the deterioration of the organic micropollutants to be greatly accelerated.

In the different technologies which have been described to date for this combined oxidation, it has been recommended that reactors be used, operating either statically and discontinuously (Glaze et al., Proceedings of the Second Intern. Conference, Edmonton, Alberta, Apr. 28-29 1987, pp. 233, 243; Namba & Nakayama, Bull Chem. Soc. Japan 55, pp. 3339-3340), or dynamically, i.e. with the water to be treated circulating continuously, but using a process in which the water circulates in a flow direction opposite to that of the oxidizing agents (Nakayama et al., Ozone, Science and Engineering, Vol. I, pp. 119, 131, 1979: D. W. Ferguson et al., Research and Technology, AWWA Journal, April 1990, pp. 181-191). It was proposed more recently to stagger in time and space hydrogen peroxide injections into an ozonization reactor in which the water to be treated is circulating, i.e. at different levels of the reactor Certificate of Addinir No. 88.17134 publ. 2640957 to French Patent No. 83,07764).

SUMMARY

Through numerous experiments, it now has been proven that, although the combined use of $O_3$ and $H_2O_2$ in treating water to be purified considerably reduced the levels of toxic organic pollutants in comparison with the use of $O_3$ alone, the different parameters for using these oxidizing agents, previously unrecognized, were very important in achieving optimum results.

The purpose of the research being to develop a dynamic industrial treatment process for the continuous oxidation of water whose organic micropollutants are to be virtually eliminated, it was surprisingly found, and contrary to teachings to date, that not only must the $O_3$ and $H_2O_2$ be injected simultaneously, but that the two oxidizing agents must be introduced at extremely closely-spaced points on the oxidation reactor, and into water to be treated which is circulating in the same direction as the ozonized gas bubbles (oxygen or ozonized air).

In this way, according to its most general definition, the process according to the invention consists of performing the combined oxidation of the water to be purified by the simultaneous injection, in the same flow direction as that of the water, of an aqueous solution of $H_2O_2$ and ozonized gas immediately at the inlet (or upstream end) of the oxidation reactor. However, in order to achieve the best results, it is necessary to make a careful selection of critical conditions/parameters, these being summarized below.

BRIEF DESCRIPTION OF DRAWING

FIGS. 1-3 are schematic illustrations of reactions in which the present invention can be successfully carried out.

DETAILED DESCRIPTION

First of all, it was found that the calculated mass ratio of $H_2O_2/O_3$ in accordance with the present invention should be between 0.20 and 1 and more advantageously between 0.20 and 0.45. In practice, the injected quantity of aqueous $H_2O_2$ solution (pure or diluted) is determined in relation to the ozonization rate applied and to the desired residual ozone in the oxidized water. When an $O_3$ residual of zero (or in any event less than 0.05 mg of $O_3/l$) is desired, a dose of hydrogen peroxide must be injected so that the $H_2O_2/O_3$ mass ratio is greater than 0.30, and is preferably greater than 0.35. However, an excess of $H_2O_2$ is undesirable because parasite reactions, which consume oxidizing radical types, could be promoted which would make the oxidation combination less efficient. Furthermore, the residual $H_2O_2$ following the oxidation reaction must be as low as possible. Such an excess of hydrogen peroxide will occur when the injected $H_2O_2$/injected $O_3$ mass ratio is greater than 0.45 g/g. When a residual ozone of x mg $O_3/l$ is desired at the outlet of the oxidation reactor, ozone will be injected in excess over $H_2O_2$, though while respecting the mass ratio of injected $H_2O_2$ injected to $O_3$-x)=0.30 g/g.

According to an advantageous arrangement of the invention, the hydrogen peroxide injection is regulated automatically by subjecting the injection system to continuous measurement of the residual ozone level in the water at the outlet of the reactor. Such a regulation system makes it possible to maintain a residual hydrogen peroxide level less than or equal to 0.25 mg/l at the outlet of the oxidation reactor, for a residual ozone content in the water of over 0.05 mg $O_3/l$ for a minimum contact time in the oxidation reactor of one minute.

In practice, the two oxidizing agents are injected simultaneously and continuously. However, it was found that, at least in some cases, yields could be improved substantially in the elimination of organic pollutants by performing this simultaneous injection in periodic pulses, at a frequency advantageously between T/60 and T/4, with T being the contact time in minutes in the oxidation reactor.

According to another arrangement of the invention, if necessary, the pH of the water to be treated is adjusted to a value of between 7 and 8, preferably approximately 7.5, for which the combined oxidation with $H_2O_2$ and $O_3$ is optimal. Depending on the type of water to be treated, the pH can either be decreased using $CO_2$ or acid, or increased using soda, lime, sodium carbonate, bicarbonate or $NH_3$.

The purpose of the examples below is to illustrate the research for the ideal configuration of the oxidation reactor, and to demonstrate the need to inject the $H_2O_2/O_3$ oxidizing combination in a flow direction the same as that of the water to be treated, and at points spaced as closely as possible (Example 1), and also to demonstrate the importance, according to the other essential characteristic of the invention, of a simultaneous injection using two oxidizing agents (Example 2).

EXAMPLE 1

Filtered water from the Seine containing 1.99 µg/l of atrazine and 0.525 µg/l of simazine was treated by combined $O_3/H_2O_2$ oxidation with a view toward reducing the levels of these organic micropollutants in the water.

The treatments were administered in a reactor composed of a 4 meter-high column having a volume of 114 liters, fed by the water to be treated at a continuous flow rate of 685 l/hour. An ozone diffuser was installed at the base of the column, and, for comparative purposes, series of experiments were performed using four different treatment methods, changing the direction in which the water was circulated and the types of hydrogen peroxide injection, i.e.:

Method a

Untreated water circulating from top to bottom in the column; $H_2O_2$ injected at the untreated water inlet at the top of the column to flow co-current with the water, and $O_3$ injected at the bottom counter-current to the water flow;

Method 1b

Untreated water also circulating from top to bottom, but $H_2O_2$ injected substantially in the middle of the column; and $O_3$ injected at the bottom to flow counter-current to the water;

Method 1c

Untreated water sent from bottom to top, thus co-current with the water flow direction, with bubbles rising from the ozone diffuser and $H_2O_2$ being injected immediately at the untreated water inlet to the column.

Method 1d

Same system as in method 1c, but with $H_2O_2$ being injected immediately above the porous plate of the ozone diffuser.

The following identical conditions were used in all four of the above cases: ozonization rate 2.9 mg $O_3$/l; injected $H_2O_2$/injected $O_3$ mass ratio 0.40 g/g; ozonized air: 14 g of $O_3/m^3$ of air; ten minutes of contact time in the reactor; temperature 23° C.

As a variation, the injection of two oxidizing agents, $O_3$ and $H_2O_2$, still simultaneous, but using 30 second-long impulses, was studied instead of continuous injection. The results are provided in Table 1 below:

TABLE 1

| Operating method | $O_3 + H_2O$ Continuous injection Elimination yield, % | | $O_3 + H_2O_2$ Pulse injection Elimination yield, % | |
|---|---|---|---|---|
| | Atrazine | Simazine | Atrazine | Simazine |
| 1a | 71.6 | 79 | 72.4 | 80 |
| 1b | 62.8 | 67.6 | 69.1 | 73.3 |

TABLE 1-continued

| Operating method | $O_3 + H_2O$ Continuous injection Elimination yield, % | | $O_3 + H_2O_2$ Pulse injection Elimination yield, % | |
|---|---|---|---|---|
| | Atrazine | Simazine | Atrazine | Simazine |
| 1c | 74.1 | 81 | 75.4 | 82.9 |
| 1d | 80.3 | 87.9 | 81.2 | 89.6 |

These results show that methods 1c and 1d yield the best abatement rates for the two pollutants in question (co-current flow), and the advantage of injecting the $H_2O_2$ as closely as possible to the gaseous $O_3$ diffusion system (method 1d gives better results than 1c), in a co-current flow direction the same as the water to be treated, and that pulse injection of $H_2O_2$ slightly increases pollution abatement yields.

EXAMPLE 2

Groundwater slightly loaded with total organic carbon (0.5 mg of C/l) containing 4.73 µg/l of atrazine was oxidized with the $O_3/H_2O_2$ combination under the following conditions: ozone dose: 3 mg/l; injected $H_2O_2$/injected $O_3$: 0.40 g/g; pH: 7.8; temperature 20° C., contact time, 10 minutes for ozone. On a comparative basis, hydrogen peroxide was added either simultaneously with the ozone, or four minutes after the ozone injection, all other operating conditions being equal. The results are provided in table 2 below:

TABLE 2

| Summary of results | Simultaneous injection | Injection of $H_2O_2$ four minutes after $O_3$ |
|---|---|---|
| Average atrazine concentration after ten tests (µg/l) | 0.152 | 0.412 |
| *Standard deviation δ | 0.071 | 0.124 |
| Average oxidation yield (%) | 96.8 + 1.5 | 91.3 + 2.7 |
| Average $H_2O_2$ residual (mg/l) | 0.15 | 0.37 |
| Average $O_3$ residual (mg/l) | 0.03 | 0.05 |

*Maximum difference from average results (out of 10 tests)

The experiments summarized above clearly show that the two oxidizing agents must be injected simultaneously in order to obtain high organic pollutant elimination yields. Moreover, the difference between the two injection methods has complete statistical significance, taking the standard deviations between the experiments into account.

The process according to the invention can be implemented in any type of water treatment installation having a phase in which the organic matter is oxidized at an appropriate stage. Three types of embodiments corresponding to FIGS. 1 to 3 are shown schematically in the accompanying drawings, for illustrative purposes.

According to the embodiment in FIG. 1, an oxidation reactor 1, provided at its base with porous plates 2 for diffusing gaseous ozone generated by ozonizer 3 and endowed with a vent 4, is fed with untreated water from bottom to top through pipe 5, treated water being removed from the reactor through the top at outlet 6. Hydrogen peroxide, diluted or otherwise, stored in receptacle 7, is injected through the appropriate pipes 8 immediately above ozone diffusion plates 2. According to a varied embodiment shown schematically by conduit 9 shown in broken lines, $H_2O_2$ can be introduced into water feed pipe 5 immediately at the inlet of the reactor, at a point near ozone diffusers 2. An automatic control system 10 making it possible to regulate the levels of $H_2O_2$ and residual ozone in the treated water is installed between an $H_2O_2$ feed valve 11 and a sensor 12 which measures the ozone level at the upper outlet of reactor 1.

According to the embodiment illustrated briefly in FIG. 2, in which oxidation also occurs in a flow direction co-current with the circulation of the water to be treated, which enters reactor 1 through bottom 5 and emerges through top 6, the pair of oxidizing agents is introduced in a static mixer 13. Arrow 14 corresponds to the injection of $O_3$ while arrow 15 designates $H_2O_2$ injection. According to the variation shown by broken line 16, the $H_2O_2$ can be introduced slightly upstream from mixer 13.

Finally, according to the variation shown in FIG. 3, water to be treated is introduced into reactor 1 through a pipe 17 having a Venturi-type mixer 18 installed in its circuit. The hydrogen peroxide and ozone are introduced, for example, respectively at locations 19 and 20, into the neck of the Venturi. According to the variation illustrated by the broken line 21, the $H_2O_2$ can be mixed with water to be treated immediately upstream from Venturi system 18.

It will be noted that in all cases and in accordance with the critical parameters of the process according to the invention, the two oxidizing agents are injected in flow directions the same as, i.e., co-current with, the water to be treated, at very closely-spaced points, at the inlet of the reactor, and that the injection is simultaneous, either continuous or in pulses.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a process for the combined oxidation of atrazine or simazine in polluted water using ozone in pure gaseous form, ozonized air, or ozonized oxygen, and a pure or diluted aqueous hydrogen peroxide solution, the improvement wherein the hydrogen peroxide and ozone are separately injected simultaneously into the water to be treated at substantially the same location of the water to be treated and in a co-current flow direction to the circulation of the water to be treated, at the inlet of an oxidation reactor.

2. Process according to claim 1, wherein the calculated mass ratio of injected $H_2O_2$/injected $O_3$ is between 0.20 and 1.

3. Process according to claim 2, wherein the pH of the water to be treated is maintained at a pH value of between 7 and 8.

4. Process according to claim 1, wherein the calculated mass ratio of injected $H_2O_2$/injected $O_3$ is kept between 0.20 and 0.45.

5. Process according to claim 1, wherein the $H_2O_2$ and $O_3$ are injected simultaneously and continuously.

6. Process according to claim 1, wherein the ozone is injected continuously, while the hydrogen peroxide is injected in pulses at intervals of between T/60 and T/4, T being the contact time in the oxidation reactor in minutes.

7. Process according to claim 1, wherein the pH of the water to be treated is adjusted to a value of between 7 and 8 before the oxidation treatment.

* * * * *